March 4, 1924. 1,485,647
H. TRUST ET AL
MIXING AND BEATING MACHINE
Filed Nov. 29, 1919
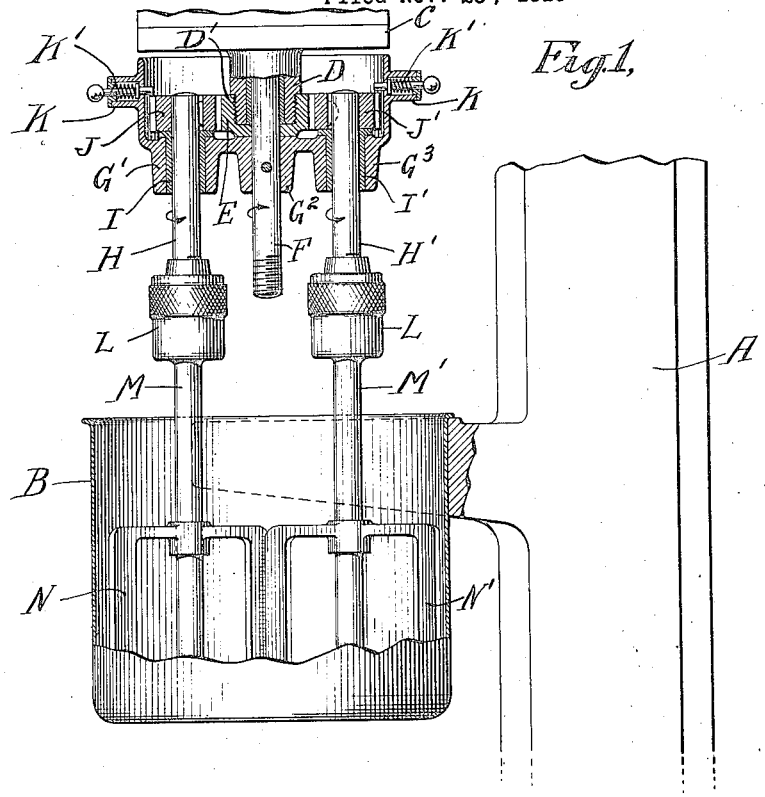
Fig.1,
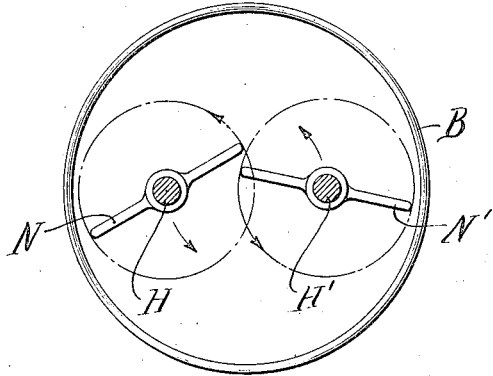
Fig.2,
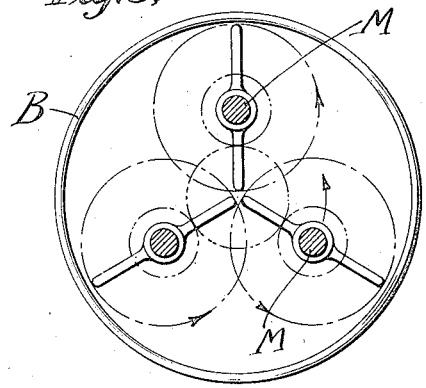
Fig.3,
Inventor
Henry Trust
Frank M. Ashley
By their Attorney
Frank M. Ashley Patented Mar. 4, 1924.

1,485,647

UNITED STATES PATENT OFFICE.

HENRY TRUST, OF PARK RIDGE, NEW JERSEY, AND FRANK M. ASHLEY, OF BROOKLYN, NEW YORK; SAID ASHLEY ASSIGNOR OF HIS RIGHT TO JOSEPHINE TRUST; JOSEPHINE TRUST ADMINISTRATRIX OF SAID HENRY TRUST, DECEASED.

MIXING AND BEATING MACHINE.

Application filed November 29, 1919. Serial No. 341,418.

*To all whom it may concern:*

Be it known that we, HENRY TRUST, a citizen of the United States, and resident of Park Ridge, in the county of Bergen and State of New Jersey, and FRANK M. ASHLEY, a citizen of the United States, and resident of Brooklyn, in the county of Kings and State of New York, have invented certain new and useful Improvements in Mixing and Beating Machines, of which the following is a specification.

Our invention relates to mixing and beating machines and the object of our invention is to provide a rotating construction of simple form which may be easily connected and disconnected from a driving shaft and in which one or more beaters can be driven and rotated. A further object is to provide means whereby one or more of the shafts to which the individual beaters are attached may be disconnected from the gear wheel which causes said shafts to rotate and be held out of operative connection. A further object is to provide a construction in which the beaters will co-act to insure a quick and thorough mixing, the arrangement being such that the travel of the periphery of the beaters will cross the central vertical axis of the receptacle in which the food ingredients are held. Also by changing the diameter of the beaters to provide a construction in which one beater will throw the ingredients being mixed into the path of the adjacent beater in such a manner as to cause a surging action and interrupted direction of the rotation of said ingredients.

Referring to the drawings which form a part of this specification:

Figure 1 is a vertical view, partly in section, of a machine embodying our invention.

Figure 2 is a plan view illustrating the path of the periphery of the beaters and the relative direction of their rotation.

Figure 3 is a plan view disclosing the preferred arrangement where three beaters are employed.

A indicates the frame which supports the receptacle B and head of a beating machine C in fixed relation therewith. D indicates a stationary hub of the machine which is threaded at $D'$ to hold the fixed stationary gear E. F indicates the main spindle of the machine driven by means not shown such as an electric motor. G indicates a housing or casing provided with three hubs $G'$, $G^2$ and $G^3$ respectively. The shaft F carries the casing G and rotates same. The spindles H and $H'$ are supported in bearings I and $I'$ respectively and on the upper end of each spindle H and $H'$ is a spur gear J and $J'$ respectively which mesh with the fixed gear E and therefore when the casing is rotated the spindles H and $H'$ are rotated in the direction indicated by the arrows. Either of the spindles H or $H'$ may be raised relative to the casing and held out of gear by the spring catch mechanism indicated by K—K respectively, the inner end of the rod $K'$ passing beneath the gear wheel and holding it in its elevated position and also serving to hold the wheel in engagement with the gear E when it projects above said gear J or $J'$ etc. L—L indicates chucks or couplings which hold the shanks M and $M'$ respectively to which the beaters N and $N'$ respectively are cast on or otherwise fastened.

When it is necessary to use a high speed wire whip, the shafts H and $H'$ are raised to inoperative position, the chucks L—L removed and a chuck is connected to the end of the shaft F to hold said whip. Also three small wire whips may be driven simultaneously by removing the beaters N and $N'$ and replacing them with whips of small diameter which are very effective for certain ingredients.

It will be noted that in the construction shown in Figure 2 the width of the beaters is such that they cross the centre of the receptacle whereas in Figure 3 the width is such that they do not cross the centre, but in both cases the beaters co-operate to throw the ingredients being mixed across the path of the opposite beater as will be readily understood.

Having thus described our invention, we claim as new and desire to secure by Letters Patent:

1. A machine comprising a stationary hub, a gear fixed thereon, a shaft extending through said hub, a casing carried by said shaft, a spindle carried by said casing, a gear wheel connected to said spindle and meshing with said fixed gear and means for holding said gear wheel out of mesh with said fixed gear.

2. A machine comprising a stationary hub, a gear fixed thereon, a shaft extending through said hub, a casing carried by said shaft, a plurality of spindles carried by said casing, a gear wheel connected to each of said spindles and meshing with said fixed gear, and means for holding either or both of said gear wheels out of mesh with said fixed gear.

Signed at New York city, in the county of New York and State of New York, this 28th day of November, A. D. 1919.

HENRY TRUST.
FRANK M. ASHLEY.